(12) United States Patent (10) Patent No.: US 8,806,294 B2
Ramaraju (45) Date of Patent: Aug. 12, 2014

(54) ERROR DETECTION WITHIN A MEMORY

(75) Inventor: Ravindraraj Ramaraju, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 152 days.

(21) Appl. No.: 13/452,501

(22) Filed: Apr. 20, 2012

(65) Prior Publication Data

US 2013/0283126 A1 Oct. 24, 2013

(51) Int. Cl.
*G11C 29/00* (2006.01)
*H03M 13/00* (2006.01)
*G01R 31/28* (2006.01)
*G06F 11/00* (2006.01)
*G06F 11/10* (2006.01)
*G06F 11/07* (2006.01)
*G06F 12/08* (2006.01)
*G06F 9/45* (2006.01)

(52) U.S. Cl.
CPC .............. *G06F 11/10* (2013.01); *G06F 11/073* (2013.01); *G06F 12/0846* (2013.01); *G06F 12/0853* (2013.01); *G06F 12/0895* (2013.01); *G06F 11/1064* (2013.01); *G06F 11/0751* (2013.01); *G06F 8/4442* (2013.01); *G06F 2211/1009* (2013.01); *G06F 2212/3042* (2013.01)
USPC ........... 714/763; 714/709; 714/718; 714/724; 714/758; 714/799; 714/10; 714/48; 714/49

(58) Field of Classification Search
CPC ... G06F 11/10; G06F 11/073; G06F 12/0846; G06F 12/0853; G06F 12/0895; G06F 11/1064; G06F 11/0751; G06F 8/4442; G06F 2211/1009; G06F 2212/3042
USPC ............. 714/763, 49, 48, 709, 718, 724, 758, 714/799, 10
See application file for complete search history.

(56) References Cited

U.S. PATENT DOCUMENTS

| | | | | |
|---|---|---|---|---|
| 4,507,729 A | * | 3/1985 | Takahashi et al. | 714/48 |
| 5,533,189 A | * | 7/1996 | Cheong et al. | 714/6.24 |
| 5,581,777 A | * | 12/1996 | Kim et al. | 712/16 |
| 5,604,753 A | * | 2/1997 | Bauer et al. | 714/763 |
| 5,642,494 A | * | 6/1997 | Wang et al. | 711/140 |
| 5,666,513 A | * | 9/1997 | Whittaker | 711/118 |
| 5,894,487 A | * | 4/1999 | Levitan | 714/819 |
| 6,038,693 A | * | 3/2000 | Zhang | 714/768 |
| 6,502,218 B1 | * | 12/2002 | George et al. | 714/805 |
| 6,505,305 B1 | * | 1/2003 | Olarig | 714/5.11 |

(Continued)

OTHER PUBLICATIONS

Chapter 5 BCH Codes, Mar. 27, 2009, 33 pgs.

*Primary Examiner* — John J Tabone, Jr.

(57) ABSTRACT

Embodiments of systems and methods for detecting errors that occur in association with an access to a memory and providing an associated error status are presented herein. According to one embodiment, an access to a memory may be received, where the access comprises a request tag. A request parity is determined based on the request tag and a stored tag and a stored parity associated with the request tag are also determined. An error correction status is determined based on the stored tag and the stored parity associated with the request tag. Additionally, a parity hotness is determined by comparing the request parity and the stored parity and a tag hotness is determined by comparing the request tag and the stored tag. An error status associated with the access is determined based on the parity hotness, the tag hotness and the error correction status.

20 Claims, 5 Drawing Sheets

(56) References Cited

U.S. PATENT DOCUMENTS

| | | | | |
|---|---|---|---|---|
| 6,622,284 | B1 * | 9/2003 | Naffziger et al. | 714/811 |
| 6,832,294 | B2 * | 12/2004 | Wicki et al. | 711/128 |
| 6,848,070 | B1 * | 1/2005 | Kumar | 714/758 |
| 6,868,484 | B2 * | 3/2005 | Supnet | 711/133 |
| 6,912,628 | B2 * | 6/2005 | Wicki et al. | 711/156 |
| 7,055,054 | B2 * | 5/2006 | Olarig | 714/5.11 |
| 7,120,836 | B1 * | 10/2006 | Englin et al. | 714/53 |
| 7,127,643 | B2 * | 10/2006 | Tremblay et al. | 714/52 |
| 7,216,284 | B2 | 5/2007 | Hsu et al. | |
| 7,243,293 | B2 | 7/2007 | Chen | |
| 7,376,877 | B2 * | 5/2008 | Quach et al. | 714/746 |
| 7,752,505 | B2 * | 7/2010 | Gschwind et al. | 714/52 |
| 7,836,377 | B2 | 11/2010 | Toda | |
| 7,840,874 | B2 * | 11/2010 | Jacob | 714/758 |
| 7,908,529 | B2 | 3/2011 | Tanaka | |
| 7,930,612 | B2 | 4/2011 | Radke et al. | |
| 7,941,733 | B2 | 5/2011 | Toda | |
| 8,051,337 | B2 * | 11/2011 | Chen | 714/53 |
| 8,190,951 | B2 * | 5/2012 | Gille | 714/723 |
| 8,291,305 | B2 * | 10/2012 | Moyer et al. | 714/799 |
| 8,356,239 | B2 * | 1/2013 | Moyer | 714/800 |
| 8,397,130 | B2 * | 3/2013 | Clark et al. | 714/763 |
| 2003/0131277 | A1 * | 7/2003 | Taylor et al. | 714/5 |
| 2006/0085717 | A1 * | 4/2006 | Tomaru et al. | 714/748 |
| 2007/0044003 | A1 * | 2/2007 | Doweck et al. | 714/763 |
| 2007/0079184 | A1 * | 4/2007 | Weiss et al. | 714/718 |
| 2009/0164727 | A1 * | 6/2009 | Penton et al. | 711/118 |
| 2009/0222708 | A1 | 9/2009 | Yamaga | |
| 2011/0161783 | A1 * | 6/2011 | Somasekhar et al. | 714/768 |
| 2011/0307663 | A1 * | 12/2011 | Kultursay et al. | 711/125 |
| 2012/0233498 | A1 * | 9/2012 | Ramaraju et al. | 714/23 |

\* cited by examiner

FIG. 5

| 510 SINGLE ERROR FLAG | 515 DOUBLE ERROR FLAG | 520 TAG COMPARE | | | 530 PARITY COMPARE | | | 540 DOUBLE ERROR STATUS | 550 HIT/MISS | 560 FAULT |
|---|---|---|---|---|---|---|---|---|---|---|
| | | MATCH | ONE-HOT | TWO-HOT | MATCH | ONE-HOT | TWO-HOT | | | |
| 0 | 0 | 1 | 0 | 0 | 1 | 0 | 0 | 0 | 1 | 0 |
| 0 | 0 | 1 | 0 | 0 | 0 | 1 | 0 | 0 | 0 | 1 |
| 0 | 0 | 1 | 0 | 0 | 0 | 0 | 1 | 0 | 0 | 1 |
| 0 | 0 | 0 | 1 | 0 | 1 | 0 | 0 | 0 | 0 | 1 |
| 0 | 0 | 0 | 1 | 0 | 0 | 1 | 0 | 0 | 0 | 1 |
| 0 | 0 | 0 | 1 | 0 | 0 | 0 | 1 | 0 | 0 | 1 |
| 0 | 0 | 0 | 0 | 1 | 1 | 0 | 0 | 0 | 0 | 1 |
| 0 | 0 | 0 | 0 | 1 | 0 | 1 | 0 | 0 | 0 | 1 |
| 0 | 0 | 0 | 0 | 1 | 0 | 0 | 1 | 0 | 0 | 1 |
| 1 | 0 | 1 | 0 | 0 | 1 | 0 | 0 | 0 | 1 | 0 |
| 1 | 0 | 1 | 0 | 0 | 0 | 1 | 0 | 0 | 1 | 0 |
| 1 | 0 | 0 | 1 | 0 | 1 | 0 | 0 | 0 | 1 | 0 |
| 1 | 0 | 0 | 1 | 0 | 0 | 1 | 0 | 0 | 0 | 1 |
| 1 | 0 | 0 | 0 | 1 | 1 | 0 | 0 | 0 | 0 | 1 |
| 1 | 0 | 0 | 0 | 1 | 0 | 1 | 0 | 0 | 0 | 1 |
| 0 | 1 | 1 | 0 | 0 | 1 | 0 | 0 | 1 | 1 | 0 |
| 0 | 1 | 1 | 0 | 0 | 0 | 1 | 0 | 1 | 1 | 0 |
| 0 | 1 | 1 | 0 | 0 | 0 | 0 | 1 | 1 | 0 | 1 |
| 0 | 1 | 0 | 1 | 0 | 1 | 0 | 0 | 1 | 0 | 1 |
| 0 | 1 | 0 | 1 | 0 | 0 | 1 | 0 | 1 | 0 | 1 |
| 0 | 1 | 0 | 1 | 0 | 0 | 0 | 1 | 1 | 0 | 1 |
| 0 | 1 | 0 | 0 | 1 | 1 | 0 | 0 | 1 | 0 | 1 |
| 0 | 1 | 0 | 0 | 1 | 0 | 1 | 0 | 1 | 0 | 1 |
| 0 | 1 | 0 | 0 | 1 | 0 | 0 | 1 | 1 | 0 | 1 |

ERROR DETECTION WITHIN A MEMORY

FIELD

This disclosure relates generally to memory error detection.

BACKGROUND

As production geometries of processor systems with associated memories decrease, the opportunities for defects in finished products increase. These defects, along with other physical events (e.g., cosmic ray passage), may result in increasing bit error rates in system memories. Along with increasing single bit error rates, the probability of double bit (or more) error rates may increase in a given area of memory.

BRIEF DESCRIPTION OF THE DRAWINGS

Present example embodiments are illustrated by way of example and are not limited by the accompanying figures, in which like references indicate similar elements. Elements in the figures are illustrated for simplicity and clarity and have not necessarily been drawn to scale.

FIG. 5 illustrates one embodiment of logical values for an embodiment of an error detection system.

DETAILED DESCRIPTION

Figure 1:
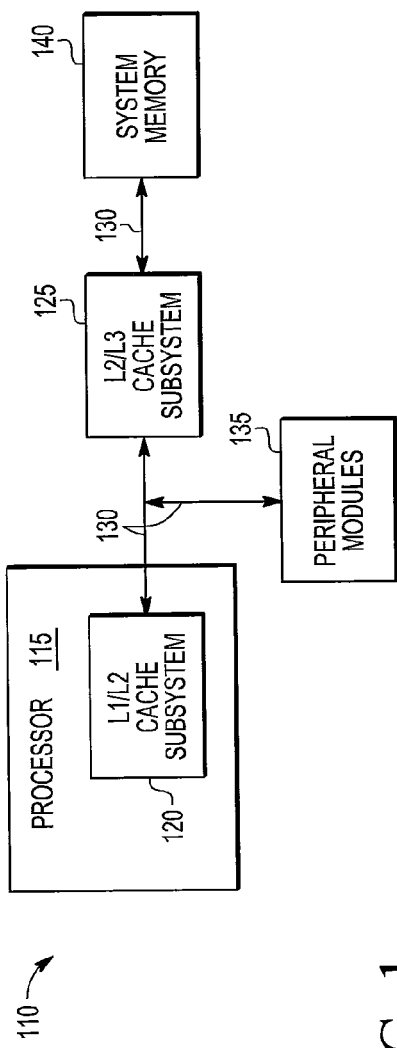
FIG. 1 illustrates one embodiment of a data processing system.

As discussed above today's high density memories can be subject to increased incidents of bit errors. Process technologies used to manufacture these high density memories can result in defects that may cause persistent weak bits that may lead to bit errors. In addition, transient bit errors may affect multiple neighboring bits in high-density memories. These bit errors may be especially problematic with respect to certain types of memories, such as cache memory or the like, because the efficacy of such memories is based on those types of memories quickly providing highly reliable data.

In order to ensure the reliability of such memories, various methodologies have employed. For example, single bit error correction (SEC) methods have been used to correct occurrences of errors in a single bit of an area memory. Single bit error correction methods, such as Hamming code methods, are attractive because they can be performed in a manner that has a minimal impact on memory latency (e.g., in a single clock cycle). But single bit error correction methods cannot correct double bit (or higher) errors such as when both a transient bit error and a persistent weak bit error occur in the same area of memory. In a circumstance where a region of memory has a double bit (or higher) error, and only single bit error correction is used, that region of memory will require reloading from a data source to correct the error. Such reloading increases memory latency due to cycles spent requesting, reading, and loading the data from the source to the region of memory.

To resolve issues related to double bit (or more) errors, polynomial code based double error correction (DEC) methods, such as Bose-Chaudhuri-Hocquenghem (BCH) code based methods, can be used. These double bit error correction methods have an advantage over single bit error correction methods in that they can significantly improve memory reliability. For example, double bit error correction methods can correct both a transient bit error and a persistent weak bit error in a same area of memory. While double bit error correction methods are robust, the process of determining the location of the errors and correcting the errors are non-trivial and can result in significantly longer memory latencies than those found in single bit error correction methods. Thus, traditionally, a tradeoff has been required between memory latency and memory reliability through correction of higher numbers of bit errors. What is desired then, would be a method of accounting for such double bit (or higher) error within a memory without any significant increase in the latency of the memory.

To that end, attention is now directed to the embodiments for detecting errors that occur in association with an access to a memory and providing an associated error status that are presented herein. In particular, in certain embodiments a received address can be used to access a memory to retrieve data in that memory. An error correction status comprising a number of bit errors (if any) associated with the retrieved data may be determined based on error correction data associated with the retrieved data. Additionally, error correction data associated with the received address may be determined. The error correction data associated with retrieved data can be compared with the error correction data determined from the received address. An error status can then be determined based on the results of this comparison and the number of bit errors associated with the retrieved data. The error status may comprise data on whether the received address was found in the memory, a number of bit errors determined with respect to the retrieved data, whether determined bit errors can or cannot be corrected for, or some combination. This error status may then be used by systems employing embodiments as disclosed herein to take a variety of actions, including correction of an error, such as a single, double, or more bit error, reporting of an error, such as to an operating system, or another action entirely.

Certain embodiments may be usefully employed in a cache memory. Such a cache memory may be accessed with a request tag and an index. The request tag and index are used to access a tag memory of the cache to retrieve a stored tag and associated stored tag parity data. The cache memory may also determine request tag parity data associated with the request tag. Error correction logic of the cache memory may determine an error correction status comprising a number of bit errors (if any) associated with the stored tag based on the stored tag and the stored tag parity data. The stored tag may be compared with the request tag to determine a tag hotness (i.e. a number of bits that are different) while the determined request tag parity data may be compared with the stored tag parity data to determine a parity hotness. An error status for the cache access may be determined based on the number of bit errors associated with the stored tag, the tag hotness and the parity hotness. Hotness as used herein will be understood as a number of bits that are different and may include or be a match if no bits are different.

By utilizing data from the comparison of the tags and parities to determine the error status, embodiments as presented herein may dispense with the need to perform certain activities with respect to error correction or detection. For example, in certain embodiments, it may be possible to obtain such an error status without introducing significant additional latency by accomplishing certain actions in parallel. Specifically, in one embodiment, the determination of error correction data associated with the request tag may be accomplished in parallel with the access to the tag memory, and the determination of the number of bit errors associated with the stored tag may be accomplished in parallel with the determination of the tag hotness and the parity hotness. Furthermore, in other embodiments, the error location polynomial iterative sequence steps usually performed in association with double error detection or correction may be avoided.

Thus, embodiments as presented herein may help resolve the traditional tension between memory reliability and memory latency by allowing error status information to be determined in conjunction with an access to the memory without introducing significant latency and by ensuring that error correction may only performed in cases where such errors may actually be corrected. Moreover, embodiments as depicted may allow memory reliability to be improved by increasing the hit rates of such memory while allowing the detection of persistent weak bit errors using the error status information.

FIG. 1 depicts a block diagram illustrating a data processing system 110. Data processing system 110 includes a processor 115 having a level one/level two (L1/L2) cache subsystem 120, a level two/level three (L2/L3) cache subsystem 125, peripheral modules 135 and system memory 140. Processor 115 may be coupled to the peripheral modules 135 and system memory 140 via bus 130. L3/L3 cache subsystem 125 may be coupled to processor 115 by bus 130. L1/L2 cache subsystem 120 may be implemented as one or both of a level one and a level two cache, depending on the architecture of processor 115. Similarly, L2/L3 cache subsystem 125 may be implemented as one or both of a level two and level three cache. Although L1/L2 cache subsystem 120 is shown as part of processor 115, L1/L2 cache subsystem 120 may be coupled to processor 115 by bus 130 or another bus. Further, one or both parts of the L1/L2 cache subsystem 1250 may be integral with processor 115 and the other coupled to processor 115 by a bus. Similarly, L2/L3 cache subsystem 125 may be incorporated into processor 115 or coupled to processor 115 by a bus other than bus 130. Cache subsystems 120 and 125 may be configured with set multi-way associate cache memories or any other suitable cache memories.

Figure 2:
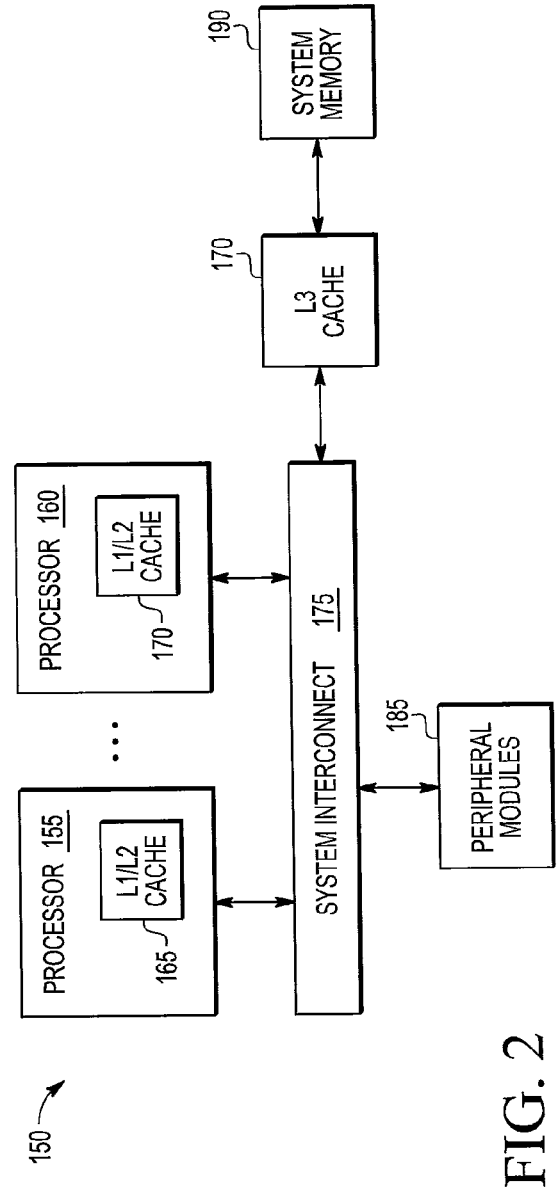
FIG. 2 illustrates one embodiment of an alternative data processing system.

FIG. 2 is a block diagram illustrating an alternative data processing system 150 usable with example embodiments. Data processing system 150 may include one or more processor 155 and 160. Processors 155 and 160 may each include an L1/L2 cache subsystem, illustrated by L1/L2 cache subsystems 165 and 170, respectively. The processors are coupled to a system interconnect 175 configured to provide communications between the processors and a L3 cache subsystem 180 and peripheral modules 185. L3 cache subsystem 180 may also be coupled to a system memory 190. Although L1/L2 cache subsystems 165 and 170 are shown as part of processors 155 and 160 respectively, the L1/L2 cache subsystems 165 and 170 may be coupled to processors 155 and/or 160 via a bus. Further the L1 and L2 caches represented by L1/L2 cache subsystems 165 and 170 may be implemented by separate subsystems (e.g., an L1 cache subsystem and an L2 cache subsystem) with one of the subsystems incorporated in the processor and another coupled to the processor by a bus.

In one embodiment, L1, L2 and L3 cache subsystems may each comprise an application appropriate amount of static random access memory (SRAM) and the system memory may comprise an application appropriate amount of dynamic random access memory (DRAM).

The term "bus" may be used to refer to a plurality of signals or conductors which may be used to transfer one or more various types of information, such as data, addresses, control or status. The conductors may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals. For example, a bus may include switches or multiplexers that may be closed to exchange information between items coupled to the bus.

Figure 3:
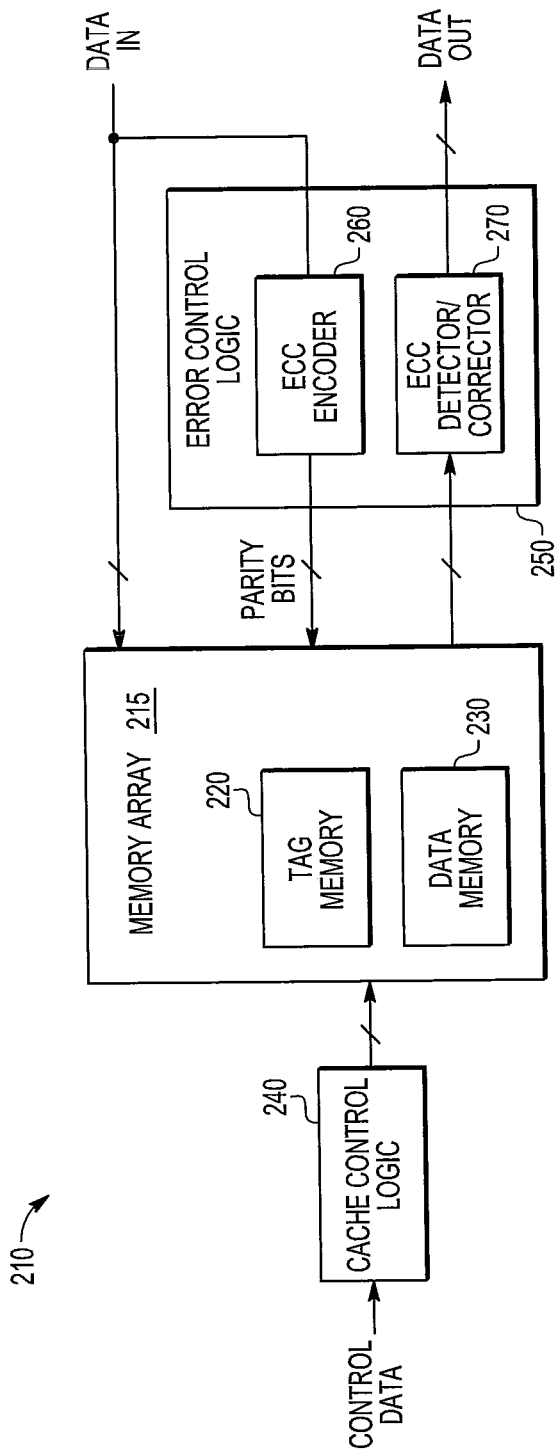
FIG. 3 illustrates one embodiment of a cache subsystem.

FIG. 3 is a block diagram illustrating an example embodiment of cache subsystem 210. Cache subsystem 210 may include a memory array 215 and cache control logic 240 coupled to the memory array 215. Memory array 215 may include tag memory 220 and data memory 230. Error control logic 250 may also be coupled to memory array 215. Cache subsystem 210 may be implemented, for example, as an L2 or L3 cache subsystem. Tag memory 220 may be used to stored tags associated with data stored within a cache system. Tag memory 220 includes a plurality of tag cells, where each tag cell includes a stored tag and associated parity data associated with a block code or a convolutional code. Data memory 230 can store instructions or data. Tag memory 220 and data memory 230 may be incorporated in a single memory array 215 or functionally separate memory arrays. Cache control logic 240 may receive a requested address and associated access information from a processor via a bus to identify data within a cache. Address information may include a request tag and associated access information may include an index associated with that tag. When the requested tag is received by the cache subsystem 210, the tag memory 220 may be accessed using the requested tag and the index to retrieve the stored tag and the associated parity bits in the tag memory 220. The stored tag, the stored parity bits, and the request tag are provided to error control logic 250.

Error control logic 250 may provide error detection functionality associated with an access to cache subsystem 210. Error control logic 250 includes Error Correction Code (ECC) encoder 260 and error detector/corrector 270. As data is received from system memory (e.g., 140 or 190) or a processor core (e.g., 115, 155 or 160) an Error Correction Code (ECC) encoder 260 may generate parity bits for the requested tag for use in error detection. Thus, ECC encoder 260 generates parity bits for a tag when the tag is stored in tag memory 220. Additionally, when cache subsystem 210 receives a request tag and associated access information, ECC encoder 260 may generate request parity bits associated with the request tag received at cache subsystem 210. It will be noted here that though the term Error Correction Code (ECC) is used herein, the terms error correction and ECC and the logic and data described in association with those terms should be understood broadly to be applicable in error detection alone, error correction alone or both. Thus, for example, with respect to ECC encoder 260, it should be understood that an ECC encoder is one embodiment of an error detection code encoder that may generate parity bits that may be utilized for error detection alone, error correction alone, or both error correction and error detection. Other embodiments of error detection code encoders may be utilized without loss of generality.

Error detection logic of error detector/corrector 270 may take as input the request tag, the request tag parity bits generated by ECC encoder 260, and the stored tag and stored tag parity bits retrieved from tag memory 220 based on the request tag. Error detection logic of error detector/corrector 270 generates an error status based on these inputs. The error status, described below with reference to FIGS. 4-6, may comprise data on whether the received request tag was found in the memory array 215, a number of bit errors found with respect to the retrieved data, whether an error can or cannot be corrected for, or some combination. This error status may then be used by systems employing embodiments as disclosed herein to take a variety of actions, including correction of an error, such as a single, double (or more) bit error, reporting of an error, or another action entirely.

Example embodiments of error detection logic are described below. Although certain embodiments are described herein, various modifications and changes may be made without departing from the scope of the embodiments. Accordingly, the descriptions presented of the error detection logic are regarded in an illustrative rather than a restrictive sense and all such modifications are intended to be included within the scope of embodiments. Any benefits, advantages or solutions that are described herein with regard to specific embodiments are not intended to be construed as critical, required or essential feature or element of any or all of the claims or other embodiments. As such embodiments as described herein are not limited to error detection within any particular type of memory (e.g., cache memory) and may be usefully applied to other types of memories, such as content addressable memories. Additionally, while certain embodiments have been described with respect to single and double bit error detection and correction it will be understood that other embodiments may be usefully employed to detect or correct higher order bit errors in a similar manner.

Figure 4:
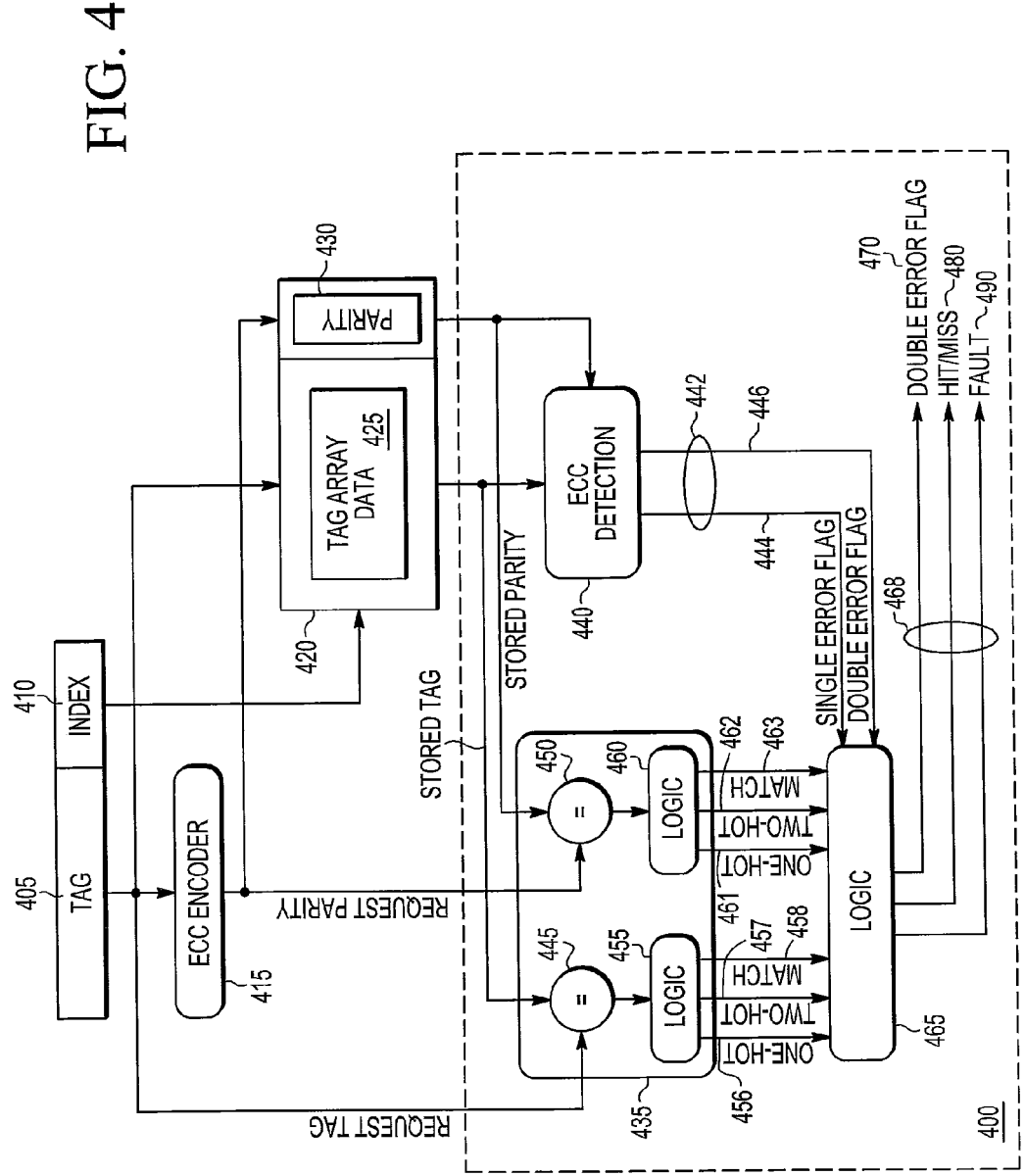
FIG. 4 illustrates one embodiment of an error detection system within a cache memory.

FIG. 4 is a block diagram illustrating cache error detection system 400 for data stored within a cache memory. Error detection system 400 may be utilized in a cache subsystem to generate an error status associated with access to a requested tag. Cache error detection system 400 as depicted in FIG. 4 may, for example, be utilized as an embodiment of error detection logic employed within error detector/corrector 270 depicted with respect to FIG. 3 above. More specifically, a requested tag and an associated index may be received at the cache. The error detection system 400 may utilize the requested tag, request tag parity bits, and the stored tag and stored parity bits retrieved from a tag memory based on the requested tag to determine an error status associated with that access.

To illustrate in more detail, when an access is made to a cache including error detection system 400, a request tag 405 and an associated index 410 is received at the cache. In one embodiment, such a request tag 405 and associated index may be provided in a register, may be provided through one or more lines or buses, etc. When a cache memory receives the request tag 405 and the associated index 410, ECC encoder logic 415 is configured to receive the request tag 405 as input and generate request parity bits based on the request tag 405. It should be understood that the ECC encoder 415 may be the same logic used for generating parity bits for a tag when the tag is stored in tag memory 420 or may utilize a similar method as such logic. As discussed above, it should also be understood that ECC encoder 415 is one embodiment of an error detection code encoder that generates parity bits that may be utilized for error detection alone, error correction alone, or both error correction and error detection. Other embodiments of error detection code encoders may also be utilized.

The received request tag 405 and index 410 are also provided as input to tag memory 420. The output of the tag memory 420 is a stored tag a stored parity associated with the requested tag 405. Error detection system 400 includes ECC detection logic 440, hotness logic 435 and error status logic 465. ECC detection logic 440 is configured to receive as input the stored tag and the stored parity bits generated from the tag memory 420 in response to the request tag 405 and index 410. Based on the stored tag and the stored parity data input ECC detection logic 440 may generate an error correction status on error correction flag 442. The ECC detection logic 440 may operate according to a variety of error correcting codes, including, for example, BCH codes, constant weight codes or other types of codes not expressly discussed herein. Again, It will be noted here that ECC detection logic 440 and the error correction status generated by ECC detection logic 440 may be utilized for error detection alone, error correction alone, or both error correction and error detection.

ECC detection logic 440 will thus set single error flag line 444 if a single bit error is detected and will set the double error flag line 446 if a double bit error is detected and will set neither the single error flag line 444 nor the double error flag line 446 if no error is detected. It will be noted as well that ECC detection logic 440 may be configured such that it is logically impossible to set both single error flag line 444 and double error flag line 446. It will be noted that if both single error flag line 444 and double bit error flag line 446 are high (e.g. because of a transient logic error due to a soft error or other type of error) the fault line of the error correction status may be set to high. The term "set" is used herein when referring to the rendering of a status bit or similar apparatus into its logically true state. If the logically true state is a logic level one, the logically false state is a logic level zero. And if the logically true state is a logic level zero the logically false state is a logic level one.

Hotness logic 435 is configured to receive as input the stored tag and the stored parity bits output from tag memory 420, the request tag 405 received by the cache and the request parity bits generated by the ECC encoder 415. Hotness logic 435 comprises tag comparator 445, parity comparator 450, tag hotness logic 455 and parity hotness logic 460. Tag comparator 445 is configured to receive the request tag 405 and the stored tag output from the tag memory 420 as input and perform a bitwise compare of the request tag 405 and the stored tag. Tag hotness logic 455 may be configured to receive the result of the bitwise compare from the tag comparator 445 and set one of a tag one-hot line 456, a tag two-hot line 457 or a tag match line 458 based on the output of the tag comparator. Tag hotness logic 455 may set the tag match line 458 if there are no bits different between the request tag 405 and the stored tag; the tag one-hot line 457 if the is one bit different between the request tag 405 and the stored tag; and the tag two-hot line 456 if there are two bits different between the request tag 405 and the stored tag. It will be noted that tag hotness logic 455 may be configured such that it is logically impossible to simultaneously set more than one of the tag match line, the tag one-hot line and the tag two-hot line.

Similarly, parity comparator 450 is configured to receive the request parity generated by the ECC encoder 415 and the stored parity bits output from the tag memory 420 and perform a bitwise compare of the request parity and the stored parity. Parity hotness logic 460 may be configured to receive the result of the bitwise compare from the parity comparator 460 and set one of a parity one-hot line 461, a parity two-hot line 462 or a parity match line 463 based on the output of the parity comparator. Parity comparator 450 may set the parity match line 463 if there are no bits different between the request parity and the stored parity; the parity one-hot line 461 if there is one bit different between the request parity and the stored parity; and the parity two-hot line 462 if there are two bits different between the request parity and the stored parity. It will be noted that parity hotness logic 460 may be configured such that it is logically impossible to simultaneously set more than one of the parity match line, the parity one-hot line and the parity two-hot line.

It will be noted from the description of hotness logics 455 and 460, that they may be configured to set additional lines like more than two-hot line or no match line (not shown in the figure) in additional to the one-hot, two-hot and match line.

Error status logic 465 is configured to receive as input the tag match line 458, the tag one-hot line 456, the tag two-hot line 457, the parity match line 463, the parity one-hot line 461, the parity two-hot line 462 and the single error flag line 444 and double error flag line 446 output by the ECC detection logic 440. Based on the values of these various inputs the error status logic 465 is configured to generate an error status 468 by setting set one or more of the double error status flag line 470, HIT/MISS line 480 and fault line 490 as will be elaborated on in more detail herein.

Thus, when an access is made to a cache including error detection system 400, a request tag 405 and an associated index 410 is received at the cache. This request tag 405 and index 410 is used to access a tag memory 420 and is provided in parallel to ECC encoder 415. Thus, the stored tag and stored parity is accessed and output by the tag memory 420 in parallel with the generation of the request parity bits by the ECC encoder 415. Similarly then, the stored tag and the stored parity output from the tag memory 420 are provided to the ECC detection logic 440 and the hotness logic 435 in parallel and the request parity bits may be provided to the hotness logic 435 in parallel with the stored tag and the stored parity. Accordingly, hotness logic 435 may be processing in parallel with ECC detection logic 440, and the output of hotness logic 435 and ECC detection logic 440 on the tag match line 458, the tag one-hot line 456, the tag two-hot line 457, the parity match line 463, the parity one-hot line 461, the parity two-hot line 462, the single error flag line 444 or the double error flag line 446 may be received by error status logic 465 substantially in parallel, and one or more of the double error status flag line 470, the HIT/MISS line 480 and the fault line 490 are set by error status logic 465 based on these inputs.

The double error status flag line 470 may be set to indicate that is an error in two bits associated with respect to the stored tag, as determined by ECC detection logic 440. In some embodiments the status of the double error status flag line 470 is the same as the status of the double error flag line 446 received as input from ECC detection logic 440. If the HIT/MISS line 480 is set it indicates that data associated with the received tag is stored in the cache and if fault line 490 is set it indicates an error has been detected that cannot be corrected by error correction logic given the ECC employed by the cache system. Although the error status 468 as illustrated in FIG. 4 includes double error status flag 470, HIT/MISS line 480 and fault line 490, one skilled in the art will realize that an error status may include other lines whose value may indicate other information, such as a parity hotness, tag hotness, a single bit error, etc. Additionally, if there is an error (for example, a transient error or the like) whereby both the single error flag line 444 and the double error flag line 446 are set, the fault line 490 may be set to indicate an error (for example, a transient error in the logic or the like).

It will be helpful here to go over the specific values produced by error status logic 465 given the values of the various inputs. FIG. 5 depicts a table 500 of values for one embodiment of error status logic 465 in FIG. 4. Note with respect to the embodiment of FIG. 5, a value of "1" indicates that a particular line has been set. Looking now at FIG. 5, Column 510 represents a value on the single error flag line 444 output from ECC detection logic 440 and column 515 represents a value on the double error flag line 446 output from ECC detection logic 440, columns 520 represent the values on the tag match line 458, the tag one-hot line 456 and the tag two-hot line 457 output from tag hotness logic 455, columns 530 represent the values on the parity match line 463, the parity one-hot line 461 and the parity two-hot line 462 output from tag hotness logic 455.

The columns 540, 550 and 560 represent the output of the error status logic 465 based on the corresponding values of the lines represented in columns 510, 520 and 530. More specifically, column 540 represents the value on double error status flag line 470, column 550 represents the status on HIT/MISS line 480 and column 560 represents the value on fault line 490. Thus, for example, row 572 represents that when the neither the single error flag line 444 or double error flag line 446 are set, the tag match line 456 is set and the parity two-hot line 462 is set error status logic 465 may set the fault line 490. Row 574 represents that when the single error flag 444 is set, the tag one-hot line 456 is set and the parity one-hot line 461 is set error status logic 465 may set the HIT/MISS line 480 indicating there has been a hit with respect to the cache.

Thus, the output of error detection logic 465 on the double error status flag line 470, the HIT/MISS line 480 and the fault line 490 comprises more information than is typically provided by error detection logic in a cache subsystem. In particular, this additional information may allow the determination of double bit (or more) errors which can be corrected for and those double bit (or more errors) which cannot be corrected for. For example, row 576 represents that when the double error flag 444 is set, the tag match line 458 is set and the parity two-hot line 462 is set, error status logic 465 may set the double error status flag line 470 and the HIT/MISS line 480, indicating both that a double bit (or more) error has been detected, but that it can be corrected for using the ECC employed by the cache. Conversely, row 578 represents that when the double error flag 446 is set, the tag one-hot line 456 is set and the parity match line 463 is set, error status logic 465 may set the double error status flag line 470 and fault line 490, indicating that a double bit (or more) error has been detected and that it cannot be corrected for using the ECC employed by the cache.

While not depicted expressly with respect to certain embodiments, it will be noted that logic may be employed which receives the output of the error status logic 465 and takes certain actions based on this output. For example, employing error correction logic to correct detected errors or signaling an interrupt to an executing operating system based on a detected fault. As the output from error status logic 465 may indicate when errors can or cannot be corrected for, the error correction logic may be applied in cases where it may be effectively employed and prevented in cases where it would not be effective. Furthermore, in certain embodiments, the output of tag comparator 445 or parity comparator 450 may be an error pattern for the tag or the parity. These error patterns may be usefully employed by error correction logic to bypass a polynomial iterative sequence step that may be used for double error correction, increasing the speed of such error correction.

Figure 6:
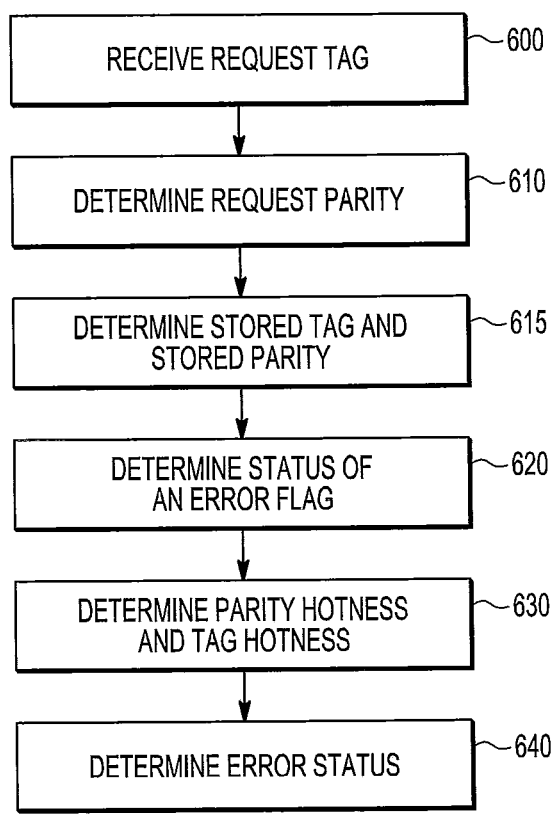
FIG. 6 illustrates one embodiment of a method for performing error detection.

Moving now to FIG. 6, one embodiment of a method which may be employed for performing error detection is depicted. Initially at step 600, a cache may receive a request tag along with an associated index. Based on the received request tag, corresponding request parity comprising one or more request parity bits may be determined at step 610. The request parity bits may be calculated according to the same ECC that was utilized to calculate the parity bits for tags being stored in the tag memory of the cache. A stored tag and a stored parity comprising one or more stored parity bits may also be determined from the request tag and associated index at step 615. The stored tag and stored parity bits may be determined, for example, by accessing a tag memory with the request tag and associated index. The calculation of the request parity bits may occur in parallel to the determination of the stored tag and stored parity bits.

At step 620 then, an error correction flag may be determined based on the stored tag and stored parity bits. The error correction flag may be determined based on the ECC employed in conjunction with the cache, as discussed above. In one embodiment, the error correction flag may comprise a single error flag and a double error flag. The single error flag is set if a single bit error is determined and the double error flag is set if a double bit error is determined.

At step 630, a parity hotness and a tag hotness may be determined based on the received request tag, the request parity bits, the stored tag and the stored parity bits. More specifically, in one embodiment, to determine a parity hotness, the request tag and the stored tag may be compared to determine if the two tags match, if there is a one bit difference between the request tag and stored tag, or if the there is a two (or more) bit difference between the request tag and the stored tag. Similarly, to determine a parity hotness the request parity bits and the stored parity bits may be compared to determine if the request parity bits and the stored parity bits match, if there is a one bit difference between the request parity bits and the stored parity bits, or if there is a two (or more) bit difference between the request parity bits and the stored parity bits. In one embodiment, the determination of an error correction flag at step 620 and the determination of the parity hotness and tag hotness at step 630 may be performed in parallel.

At step 640, then, an error status may be determined based on the error correction flag, the parity hotness and the tag hotness. In one embodiment, the error status may comprise a double error status flag, a HIT/MISS flag and a fault flag. The double error status flag indicates if a double bit (or more) error has been detected with respect to the stored tag. The HIT/MISS flag may indicate if a cache hit has occurred and the fault flag may indicate if a bit error which cannot be corrected has been detected which cannot be corrected. One embodiment of the values for the double error status flag, the HIT/MISS flag and the fault flag given particular values for the error correction flag, the parity hotness and the tag hotness are presented above with respect to FIG. 5.

After reviewing the above description one skilled in the art will realize that the number of bit errors that are detectable may be based on a hamming distance and the number of parity bits corresponding to a tag and that depending on the hamming distance, the ECC and number of parity bits utilized in conjunction with a particular embodiment and certain embodiments may be usefully utilized to provide an error status with respect to triple bit or higher errors. Additionally it will be realized that the error status produced by embodiments of the error detection logic presented herein may include less or additional information as desired, such as, for example, parity hotness, tag hotness, single error status flag, and/or other error flags As discussed, then, embodiments as described herein provide systems and methods for detecting errors that occur in association with an access to a memory and providing an associated error status that are presented herein. According to one embodiment, an access to a memory (such as a cache memory, a CAM, etc.) may be received, where the access comprises a request tag. A request parity is determined based on the request tag and a stored tag and a stored parity associated with the request tag are also determined. An error correction status is determined based on the stored tag and the stored parity associated with the request tag. Additionally, a parity hotness is determined by comparing the request parity and the stored parity and a tag hotness is determined by comparing the request tag and the stored tag. An error status associated with the access is determined based on the parity hotness, the tag hotness and the error correction status.

In certain embodiments, the error correction status is determined in parallel with the determination of the parity hotness and the tag hotness or the request parity is determined in parallel with the determination of the stored tag and the stored parity associated with the request tag.

In other embodiments, the error correction status indicates no error, a single bit error or a double bit error and the error status comprises a hit/miss value indicating if the requested tag is located in the memory, a double bit status error value indicating if a double bit error was detected with respect to the access and a fault value indicating if a detected double bit error can be corrected. Additionally, in some embodiments, the double bit status error value indicates a double bit error only if the error correction status indicates a double bit error.

Although example embodiments are described herein with reference to specific embodiments, various modifications and changes may be made without departing from the scope of the embodiments as set for in the claims below. Accordingly, the specification and figures are to be regarded in an illustrative rather than a restrictive sense, and all such modifications are intended to be included within the scope of the embodiments. Any benefits, advantages, or solutions to problems that are described herein with regard to specific embodiments are not intended to be construed as a critical, required, or essential feature or element of any or all the claims.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Also for example, in one embodiment, the illustrated elements of systems 110 and 150 are circuitry located on a single integrated circuit or within a same device. Alternatively, the systems and subsystems may include any number of separate integrated circuits or separate devices interconnected with each other. For example, system memory 140 may be located on a same integrated circuit as processor 115 or on a separate integrated circuit or located within another peripheral or slave discretely separate from other elements of system 110. Peripheral modules 135 or 185 may also be located on separate integrated circuits or devices.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the above-discussed embodiments can be implemented with software modules that perform one or more tasks associated with the embodiments. The software modules described include data processing systems 110 and 150, and for example, computer-readable storage media such as system memory 140 or 190, respectively, or other media on other computer systems where the memory may include the code for performing the tasks or functions. Such computer readable storage media may be permanently, removably or remotely coupled to a data processing system. The computer-readable storage media may include non-transitory computer readable storage media, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, and the like. Other new and various types of non-transitory computer-readable storage media may be used to store the modules discussed herein. Non-transitory computer readable storage media include all computer-readable media except for a transitory, propagating signal.

In one embodiment, data processing system 110 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. An error detection system in a memory, comprising:
   a tag memory configured to generate a stored tag and a stored parity associated with a request tag received in association with an access to the memory;
   an error detection code encoder configured to determine a request parity based on the received request tag;
   Error Correction Code (ECC) detection logic coupled to the tag memory and configured to determine an error correction status based on the stored tag and the stored parity;
   hotness logic coupled to the tag memory and the error detection code encoder and configured to receive the stored tag and the stored parity from the tag memory, receive the request tag, receive the request parity from the error detection code encoder, determine a parity hotness by comparing the stored parity and the request parity, and determine a tag hotness by comparing the stored tag and the request tag; and
   error status logic coupled to the hotness logic and the ECC detection logic and configured to receive the parity hotness, the tag hotness and the error correction status and determine an error status based on the parity hotness, tag hotness, and the error correction status.

2. The system of claim 1, wherein the ECC detection logic is configured to operate in parallel with the hotness logic.

3. The system of claim 2, wherein the stored tag and the stored parity are received at the hotness logic from the tag memory when it is accessed with the request tag, and the error detection code encoder is configured to operate in parallel with an access to the tag memory.

4. The system of claim 3, wherein the error correction status is provided on a double error flag line and a single error flag line and the error status is provided on a double error status line, a HIT/MISS line and a fault line, wherein the HIT/MISS line is set to indicate that the requested tag is located in the memory, the double bit status error line is set to indicate that a double bit error was detected with respect to the access and a fault value is set to indicate that a detected double bit error cannot be corrected.

5. The system of claim 4, wherein the double bit status error line is set only if the double error flag line is set.

6. The system of claim 1, wherein the hotness logic is configured to compare the request tag and the stored tag to determine a number of bits that are different between the request tag and the stored tag.

7. The system of claim 6, wherein the hotness logic is configured to compare the request parity and the stored parity to determine a number of bits that are different between the request parity and the stored parity.

8. The system of claim 7, wherein the tag hotness is provided to the error status logic on a tag match line, a tag one-hot line and a tag two-hot line and the parity hotness is provided to the error status logic on a parity match line, a parity one-hot line and a parity two-hot line, wherein the tag match line is set if there are no bits different between the request tag and the stored tag, the tag one-hot line is set if there is a one bit difference between the request tag and the stored tag, the tag two-hot line is set if there is a two bit difference between the request tag and the stored tag, the parity match line is set of there are no bits different between the request parity and the stored parity, the parity one-hot line is set if there is a one bit difference between the request parity and the stored parity and the parity two-hot line is set if there is a two bit difference between the request parity and the stored parity.

9. A method for error detection in a memory, the method comprising:
  receiving an access to a memory, wherein the access comprises a request tag; determining a request parity based on the request tag;
  retrieving a stored tag and a stored parity associated with the request tag;
  determining an error correction status based on the stored tag and the stored parity associated with the request tag;
  determining a parity hotness by comparing the request parity and the stored parity;
  determining a tag hotness by comparing the request tag and the stored tag; and
  determining an error status associated with the access based on the parity hotness, the tag hotness and the error correction status.

10. The method of claim 9, wherein the memory is a cache and the access an access to the cache.

11. The method of claim 10, wherein the error correction status is determined in parallel with the determination of the parity hotness and the tag hotness.

12. The method of claim 11, wherein the request parity is determined in parallel with the determination of the stored tag and the stored parity associated with the request tag.

13. The method of claim 12, wherein the error correction status indicates no error, a single bit error or a double bit error and the error status comprises a hit/miss value indicating if the requested tag is located in the memory, a double bit status error value indicating if a double bit error was detected with respect to the access and a fault value indicating if a detected double bit error can be corrected.

14. The method of claim 9, wherein the request tag and the stored tag are compared to determine a number of bits that are different between the request tag and the stored tag.

15. The method of claim 14, wherein the tag hotness indicates the number of bits that are different between the request tag and the stored tag.

16. The method of claim 15, wherein the request parity and the stored parity are compared to determine a number of bits that are different between the request parity and the stored parity.

17. The method of claim 16, wherein the parity hotness indicates the number of bits that are different between the request parity and the stored parity.

18. The method of claim 9, where the double bit status error value indicate a double bit error only if the error correction status indicates a double bit error.

19. A cache system including error detection, the cache system comprising:
  an error detection code encoder configured to determine a request parity based on a request tag received at a cache in association with an access;
  a tag memory operating in parallel with the error detection code encoder and configured to receive the request tag and determine a stored tag and a stored parity, wherein the tag memory and the error detection code encoder are configured to operate in parallel;
  ECC detection logic coupled to the tag memory and configured to receive the stored tag and the stored parity, determine an error correction status based on the stored tag and the stored parity and provide the error correction status on a single error flag line and a double error flag line;
  hotness logic coupled to the error detection code encoder and the ECC detection logic, wherein the hotness logic is operating in parallel with the ECC detection logic and configured to receive the stored tag and the stored parity, receive the request tag, receive the request parity from the error detection code encoder, determine a parity hotness by comparing the stored parity and the request parity and determine a tag hotness by comparing the stored tag and the request tag, provide the tag hotness on a tag match line, a tag one-hot line and a tag two-hot line, and provide the parity hotness on a parity match line, a parity one-hot line and a parity two-hot line; and
  error status logic coupled to the hotness logic and the ECC detection logic and configured to receive the parity hotness, the tag hotness and an error correction status, and determine an error status based on the parity hotness, tag hotness, and the error correction status, wherein the error status is provided on a double error status line, a HIT/MISS line and a fault line, wherein the HIT/MISS line is set to indicate that the requested tag is located in the memory, the double bit status error line is set to indicate that a double bit error was detected with respect to the access and a fault value is set to indicate that a detected double bit error cannot be corrected.

20. The cache system of claim 19, wherein the hotness logic is configured to compare the request tag and the stored tag to determine a number of bits that are different between the request tag and the stored tag, compare the request parity and the stored parity to determine a number of bits that are different between the request parity and the stored parity and set the tag match line if there are no bits different between the request tag and the stored tag, set the tag one-hot line if there is a one bit difference between the request tag and the stored tag, set the tag two-hot line if there is a two bit difference between the request tag and the stored tag, set the parity match line if there are no bits different between the request parity and the stored parity, set the parity one-hot line if there is a one bit difference between the request parity and the stored parity and set the parity two-hot line if there is a two bit difference between the request parity and the stored parity.

* * * * *